(12) United States Patent
Griesemer

(10) Patent No.: US 6,192,516 B1
(45) Date of Patent: *Feb. 20, 2001

(54) INTERPRETER GENERATION AND IMPLEMENTATION UTILIZING INTERPRETER STATES AND REGISTER CACHING

(75) Inventor: Robert Griesemer, Menlo Park, CA (US)

(73) Assignee: Sun Microsystems, Inc., Palo Alto, CA (US)

( * ) Notice: Under 35 U.S.C. 154(b), the term of this patent shall be extended for 0 days.

This patent is subject to a terminal disclaimer.

(21) Appl. No.: 09/300,555

(22) Filed: Apr. 27, 1999

Related U.S. Application Data

(63) Continuation of application No. 08/885,008, filed on Jun. 30, 1997, now Pat. No. 6,021,273.

(51) Int. Cl.[7] ........................................ G06F 9/45
(52) U.S. Cl. .................................................. 717/9
(58) Field of Search ............................. 717/5–9

(56) References Cited

U.S. PATENT DOCUMENTS

| | | | |
|---|---|---|---|
| 5,678,044 | * 10/1997 | Pastilha et al. | 717/4 |
| 5,684,996 | * 11/1997 | Westerholm et al. | 717/11 |
| 5,758,162 | 5/1998 | Takayama . | |
| 5,999,731 | * 12/1999 | Yellin et al. | 717/4 |

FOREIGN PATENT DOCUMENTS

0838756 A1 * 4/1998 (EP) ................................. G06F/9/45

OTHER PUBLICATIONS

Ertl, M., Stack Caching for Interpreters, 1994, p3–12.*

Ertl, M., Stack Caching for Interpreters, 1995, p.315–327.*

* cited by examiner

Primary Examiner—Mark R. Powell
Assistant Examiner—John Q Chavis
(74) Attorney, Agent, or Firm—Beyer Weaver&Thomas, LLP

(57) ABSTRACT

Systems and methods for increasing the execution speed of interpreted programs which utilize an operand stack are provided. The value for the top of the operand stack is stored in one or more registers. A state of the interpreter indicates the data type of the value for the top of the operand stack stored in the one or more registers. An interpreter may be generated that is both fast and efficient in terms of the memory required for the interpreter.

24 Claims, 10 Drawing Sheets

TEMPLATE TABLE 501

| BYTECODE | STATE BEFORE | TEMPLATE FUNCTION | STATE AFTER |
|---|---|---|---|
| 0 | <ANY> | NOP( ) | <STATE> |
| ... | ... | | |
| 21 | VTOS | ILOAD( ) | ITOS |
| 22 | VTOS | LLOAD( ) | LTOS |
| 23 | VTOS | FLOAD( ) | FTOS |
| 24 | VTOS | DLOAD( ) | DTOS |
| ... | ... | | |
| 54 | ITOS | ISTORE( ) | VTOS |
| 55 | LTOS | LSTORE( ) | VTOS |
| 56 | FTOS | FSTORE( ) | VTOS |
| 57 | DTOS | DSTORE( ) | VTOS |
| ... | | | |
| 96 | ITOS | IADD( ) | ITOS |
| 97 | LTOS | LADD( ) | LTOS |
| 98 | FTOS | FADD( ) | FTOS |
| 99 | DTOS | DADD( ) | DTOS |
| ... | ... | | |

INTERPRETER GENERATION AND IMPLEMENTATION UTILIZING INTERPRETER STATES AND REGISTER CACHING

This is a Continuation application of prior application Ser. No. 08/885,008 filed on Jun. 30, 1997, now U.S. Pat. No. 6,021,273.

BACKGROUND OF THE INVENTION

The present invention relates to software interpreter implementation and generation. More specifically, implementing and generating an interpreter for the Java™ virtual machine that utilizes registers to optimize the stack-based operations.

The Java™ programming language is an object-oriented high level programming language developed by Sun Microsystems and designed to be portable enough to be executed on a wide range of computers ranging from small personal computers up to supercomputers. Computer programs written in Java (and other languages) may be compiled into virtual machine instructions for execution by a Java virtual machine. In general the Java virtual machine is an interpreter that decodes and executes the virtual machine instructions.

The virtual machine instructions for the Java virtual machine are bytecodes, meaning they include one or more bytes. The bytecodes are stored in a particular file format called a "class file." In addition to the bytecodes, the class file includes a symbol table as well as other ancillary information.

A computer program embodied as Java bytecodes in one or more class files is platform independent. The computer program may be executed, unmodified, on any computer that is able to run an implementation of the Java virtual machine. The Java virtual machine is a software emulator of a "generic" computer which is a major factor in allowing computer programs for the Java virtual machine to be platform independent.

The Java virtual machine is commonly implemented as an software interpreter. Conventional interpreters decode and execute the virtual machine instructions of an interpreted program one instruction at a time during execution. Compilers, on the other hand, decode source code into native machine instructions prior to execution so that decoding is not performed during execution. Because conventional interpreters decode each instruction before it is executed repeatedly each time the instruction is encountered, execution of interpreted programs is typically quite slower than compiled programs because the native machine instructions of compiled programs can be executed on the native machine or computer system without necessitating decoding.

As a software interpreter must be executing in order to decode and execute an interpreted program, the software interpreter consumes resources (e.g., memory) that will therefore no longer be available to the interpreted program. This is in stark contrast to compiled programs that execute as native machine instructions so they may be directly executed on the target computer and are therefore generally free to utilize more resources than interpreted programs.

Accordingly, there is a need for new techniques for increasing the execution speed of computer programs that are being interpreted. Additionally, there is a need to provide interpreters that are efficient in terms of the resources they require.

SUMMARY OF THE INVENTION

In general, some embodiments of the present invention provide innovative systems and methods for increasing the execution speed of computer programs executed by an interpreter. The interpreter includes an operand stack that is utilized to execute the virtual machine instructions. The value for the top of the operand stack is stored in one or more registers which allows the execution speed of stack-based virtual machine instructions to be increased. A state of the interpreter is utilized to indicate the data type of the value for the top of the operand stack stored in the one or more registers. With the invention, the programs may be interpreted in a more efficient manner utilizing registers. Additionally, the size of the interpreter may kept small which allows more resources to be available for the interpreted program. Several embodiments of the invention are described below.

In one embodiment, a computer implemented method for implementing an interpreter including an operand stack is provided. A value for the top of the operand stack is stored in at least one register of the computer instead of on the stack. Many conventional computers have registers for storing different data types. Accordingly, the value for the top of the stack is stored in one or more registers appropriate for its data type and the state of the interpreter is utilized to indicate the data type of the value for the top of the operand stack that is stored in the one or more registers. In preferred embodiments, the interpreter is a Java virtual machine and the states of the interpreter may include integer, long integer, single-precision floating point, and double-precision floating point.

In another embodiment, a computer implemented method for generating an interpreter that stores a value for the top of an operand stack in one or more registers is provided. The state of the interpreter indicates a data type of the value for the top of the operand stack that is stored in the one or more registers. In order to generate the interpreter, the computer may loop through all the possible virtual instructions and states of the interpreter. In each iteration, a virtual machine instruction and a state of the interpreter may be selected. If the selected state differs from the state of the interpreter that is expected prior to the execution of the selected virtual machine instructions, computer code for the interpreter is generated to put the interpreter in the expected state. Once it is known that the interpreter is in the expected state prior to the execution of the selected virtual machine instruction, computer code for the interpreter is generated to execute the selected virtual machine instruction. The expected state for the selected virtual machine instruction may be obtained by accessing a table indexed by virtual machine instructions that stores expected states of the interpreter before execution of the virtual machine instructions and current states of the interpreter after execution of the virtual machine instructions. Additionally, the computer code for the interpreter to execute the selected virtual machine instruction may be generated by calling a function specified in the table.

In another embodiment, a data structure stored by a computer readable medium for an interpreter of virtual machine instructions is provided. The data structure is a table indexed by virtual machine instructions and having multiple fields. In one field of the table, expected states of the interpreter before execution of the virtual machine instructions are stored. In another field of the table is stored current states of the interpreter after execution of the virtual machine instructions. Additionally, a field of the table may be utilized to store pointers to functions that generate computer code for the interpreter to execute the virtual machine instructions. In a preferred embodiment, a state of the interpreter indicates the data type of a value for the top of an operand stack of the interpreter that is stored in one or more registers.

In another embodiment, a data structure stored by a computer readable medium for an interpreter of virtual machine instructions is provided. The data structure is a table indexed by virtual machine instructions and having multiple fields, each field being associated with a state of the interpreter and storing a pointer to a location in the interpreter that executes the indexed virtual machine instructions. The state of the interpreter may indicate the data type of a value for the top of an operand stack of the interpreter that is stored in one or more registers. In preferred embodiments, the state of the interpreter may be integer, long integer, single-precision floating point, and double-precision floating point.

Other features and advantages of the invention will become readily apparent upon review of the following detailed description in association with the accompanying drawings.

BRIEF DESCRIPTION OF THE DRAWINGS

FIG. 5 illustrates a template table utilized during interpreter generation to organize interpreter states and template functions.

DETAILED DESCRIPTION OF PREFERRED EMBODIMENTS

Definitions

Machine instruction—An instruction that directs a computer to perform an operation specified by an operation code (opcode) and optionally one or more operand.

Virtual machine instruction—A machine instruction for a software emulated microprocessor or computer architecture (also called virtual code).

Native machine instruction—A machine instruction that is designed for a specific microprocessor or computer architecture (also called native code).

Class—An object-oriented data type that defines the data and methods that each object of a class will include.

Function—A software routine (also called a subroutine, procedure, member function, and method).

Operand stack—A stack utilized to store operands for use by machine instructions during execution.

Bytecode pointer (BCP)—A pointer that points to the current Java virtual machine instruction (e.g., bytecode) that is being executed.

Program counter (PC)—A pointer that points to the machine instruction (typically native) of the interpreter that is being executed.

Interpreter—A program in software or hardware that typically translates and then executes each instruction in a computer program.

Interpreter generator—A program in software or hardware that generates an interpreter.

Overview

In the description that follows, the present invention will be described in reference to a preferred embodiment that implements a Java virtual machine for executing Java virtual machine instructions (bytecodes). In particular, examples will be described including native machine instructions of IBM personal computers (Intel x86 microprocessor architectures). However, the invention is not limited to any particular language, computer architecture, or specific implementation. Therefore, the description of the embodiments that follow is for purposes of illustration and not limitation.

Figure 1:
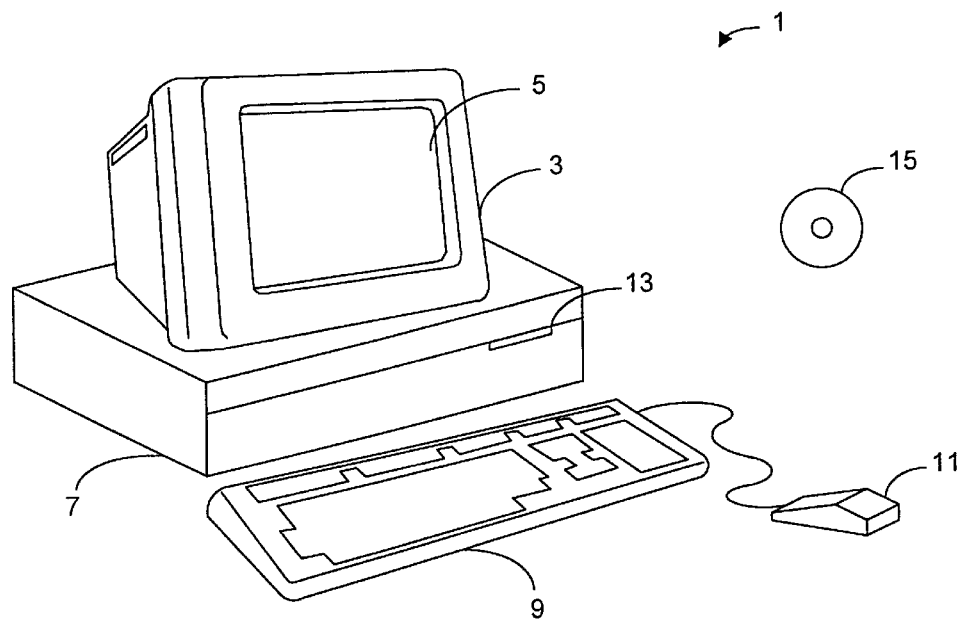
FIG. 1 illustrates an example of a computer system that may be utilized to execute the software of an embodiment of the invention.

FIG. 1 illustrates an example of a computer system that may be used to execute the software of an embodiment of the invention. FIG. 1 shows a computer system 1 which includes a display 3, screen 5, cabinet 7, keyboard 9, and mouse 11. Mouse 11 may have one or more buttons for interacting with a graphical user interface. Cabinet 7 houses a CD-ROM drive 13, system memory and a hard drive (see FIG. 2) which may be utilized to store and retrieve software programs incorporating computer code that implements the invention, data for use with the invention, and the like. Although the CD-ROM 15 is shown as an exemplary computer readable storage medium, other computer readable storage media including floppy disk, tape, flash memory, system memory, and hard drive may be utilized. Additionally, a data signal embodied in a carrier wave (e.g., in a network including the Internet) may be the computer readable storage medium.

Figure 2:
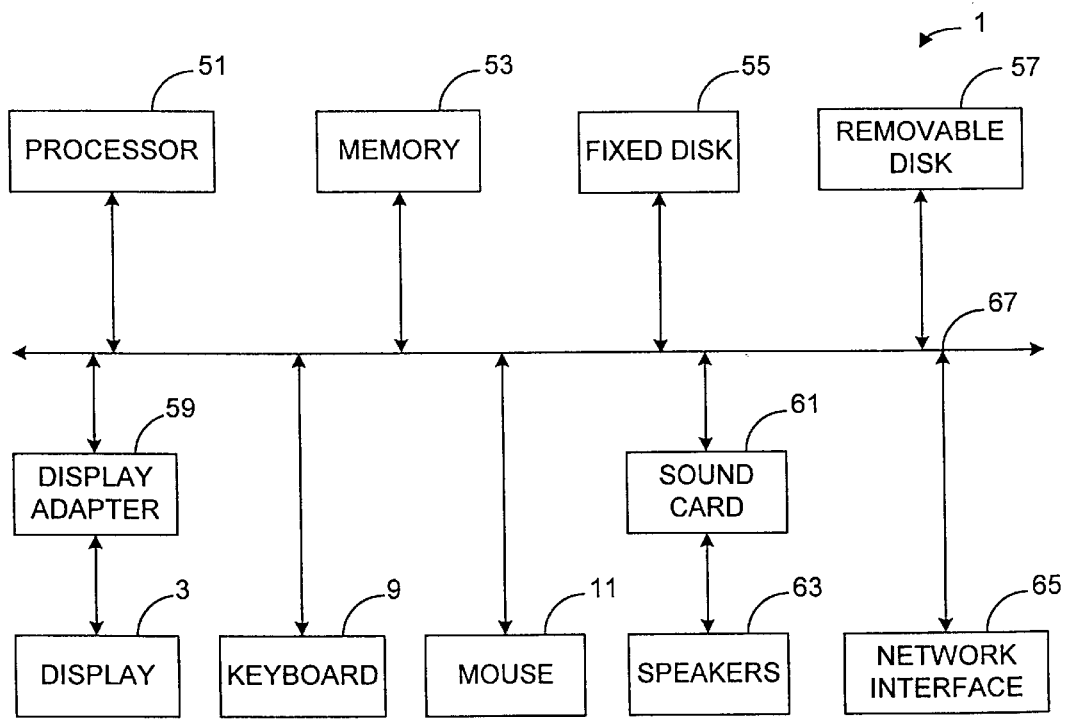
FIG. 2 shows a system block diagram of the computer system of FIG. 1.

FIG. 2 shows a system block diagram of computer system 1 used to execute the software of an embodiment of the invention. As in FIG. 1, computer system 1 includes monitor 3 and keyboard 9, and mouse 11. Computer system 1 further includes subsystems such as a central processor 51, system memory 53, fixed storage 55 (e.g., hard drive), removable storage 57 (e.g., CD-ROM drive), display adapter 59, sound card 61, speakers 63, and network interface 65. Other computer systems suitable for use with the invention may include additional or fewer subsystems. For example, another computer system could include more than one processor 51 (i.e., a multi-processor system), or a cache memory.

The system bus architecture of computer system 1 is represented by arrows 67. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for use with the invention. Other computer architectures having different configurations of subsystems may also be utilized.

Figure 3:
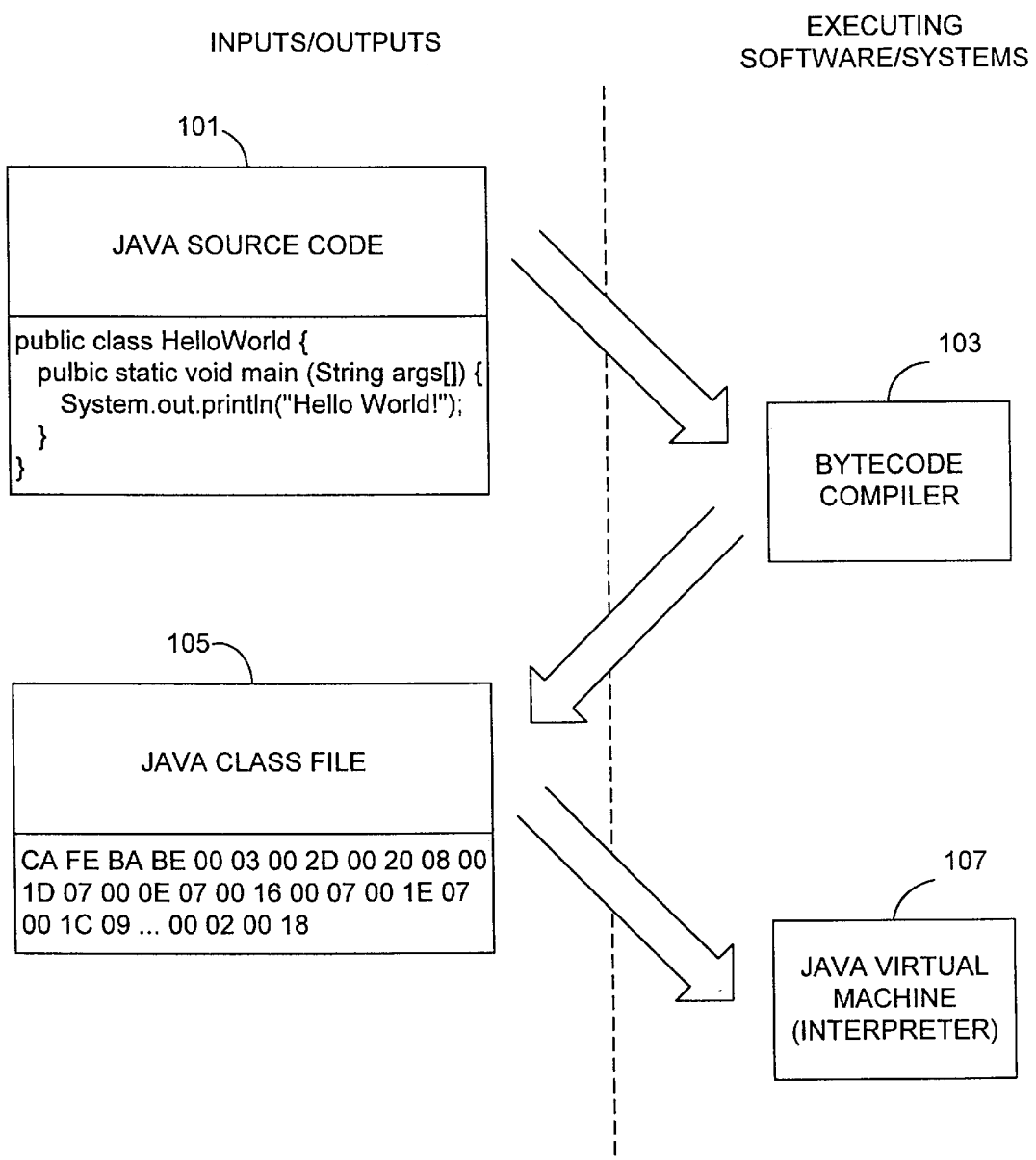
FIG. 3 shows how a Java source code program is executed.

Typically, computer programs written in the Java programming language are compiled into bytecodes or Java virtual machine instructions which are then executed by a Java virtual machine. The bytecodes are stored in class files which are input into the Java virtual machine for interpretation. FIG. 3 shows a progression of a simple piece of Java source code through execution by an interpreter, the Java virtual machine.

Java source code 101 includes the classic Hello World program written in Java. The source code is then input into a bytecode compiler 103 which compiles the source code into bytecodes. The bytecodes are virtual machine instructions as they will be executed by a software emulated computer. Typically, virtual machine instructions are generic (i.e., not designed for any specific microprocessor or computer architecture) but this is not required. The bytecode compiler outputs a Java class file 105 which includes the bytecodes for the Java program.

The Java class file is input into a Java virtual machine 107. The Java virtual machine is an interpreter that decodes and executes the bytecodes in the Java class file. The Java virtual machine is an interpreter, but is commonly referred to as a virtual machine as it emulates a microprocessor or computer architecture in software (e.g., the microprocessor or computer architecture that may not exist in hardware).

An interpreter may execute a bytecode program by repeatedly executing the following steps:

Execute—execute operation of the current bytecode

Advance—advance bytecode pointer to next bytecode

Dispatch—fetch the bytecode at the bytecode pointer and jump to the implementation (i.e., execute step) of that bytecode.

The execute step implements the operation of a particular bytecode. The advance step increments the bytecode pointer so that it points to the next bytecode. Lastly, the dispatch step fetches the bytecode at the current bytecode pointer and jumps to the piece of native machine code that implements that bytecode. The execution of the execute-advance-dispatch sequence for a bytecode is commonly called an "interpretation cycle."

Although in a preferred embodiment, the interpreter utilizes the interpretation cycle described above, many other interpretation cycles may be utilized in conjunction with the present invention. For example, an interpreter may perform dispatch-execute-advance interpretation cycles or there may be more or fewer steps in each cycle. Accordingly, the invention is not limited to the embodiments described herein.

Java Virtual Machine Implementation and Generation

The virtual machine instructions for the Java virtual machine include stack-based instructions. Thus, one or more of the operands of the virtual machine instructions may be stored in an operand stack. Before describing the operand stack, it may be beneficial to discuss a general stack.

Figure 4A:
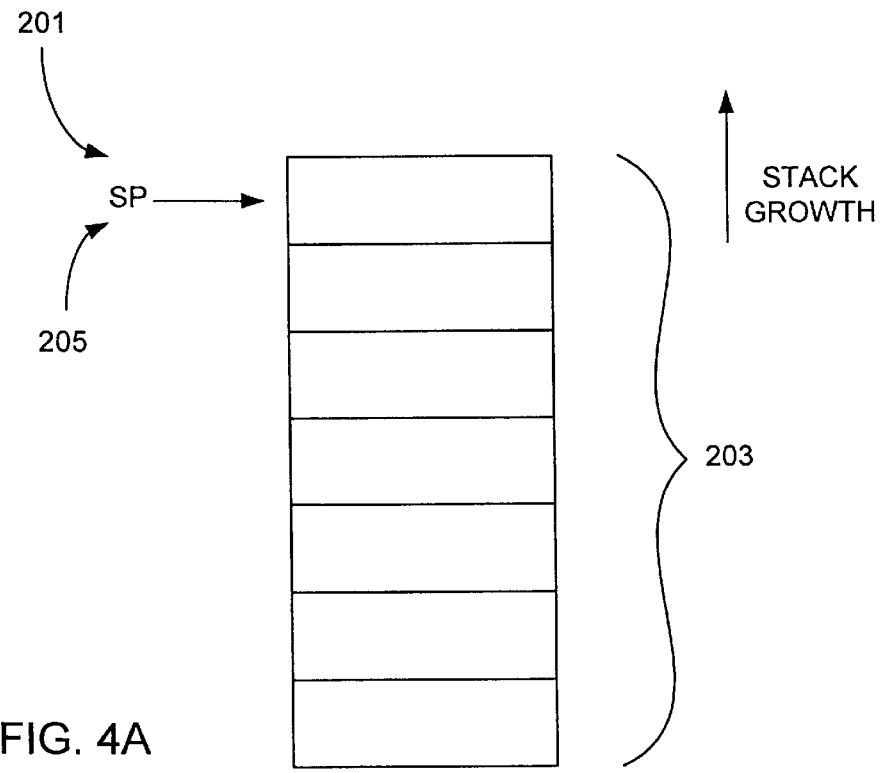
FIG. 4A shows a stack.

FIG. 4A shows a stack 201 that stores data 203. With the stack, a data value may be "pushed" onto the top of the stack. Alternatively, a data value may be "popped" off the top of the stack. Conceptually, only the top of the stack may be accessed so the stack is known as a first in, first out (FIFO) data structure meaning that the data that was most recently pushed onto the stack will be the first data to be popped off the stack. A stack pointer (SP) 205 points to the top of stack 201. Thus, the SP will change as data values are pushed onto and popped off the stack. For simplicity, the stacks described herein are shown and described as growing upwards in memory; however, this is just a graphical representation and those of skill in the art will readily recognize that a stack may be shown and/or implemented in many other ways (e.g., growing downwards in memory).

The virtual machine instructions for the Java virtual machine call for an implementation of an operand stack that may be similar to the stack shown in FIG. 4A. More specifically, the operand stack in the Java virtual machine is utilized to store operands for use by the bytecodes during execution. The following is an example that may help illustrate how an operand stack is utilized in the Java virtual machine.

Assume that the Java source code includes a statement X:=A+B, where X, A and B are integer variables. This statement may be compiled into the following bytecodes:

1. ILOAD A
2. ILOAD B
3. IADD
4. ISTORE X

It should be noted that the "I" preceding each bytecode indicates that the data type of the values manipulated by the bytecodes are integers. There are corresponding bytecodes for other data types which are designated by an "L" for long integer, "F" for single-precision floating point, and "D" for double-precision floating point. In the Java virtual machine, the integer data type is 32 bits, long integer data type is 64 bits, the single-precision floating point data type is 32 bits, and the double-precision floating point data type is 64 bits. As will be illustrated below, the size of these data types in the virtual machine may not be the same as in the computer system implementing the virtual machine (e.g., the standard integer data type on an IBM personal computer is 16 bits and there is no direct support for 64 bit long integers), so it is important to make a distinction between the Java virtual machine instructions and the native machine instructions that direct the computer on which the virtual machine is implemented.

The first ILOAD bytecode loads the value of variable A onto the operand stack. Similarly, the second ILOAD bytecode loads the value of variable B onto the operand stack. The bytecode IADD pops two data values off the operand stack, adds the two values and pushes the sum onto the operand stack. As may be expected, the ISTORE bytecode pops a data value off the operand stack, the sum in this case, and stores it in variable X. This simple example illustrates conceptually how Java bytecodes utilize an operand stack.

Some embodiments of the present invention take advantage of the fact that oftentimes when a data value is pushed onto the operand stack, it will subsequently be popped off the operand stack (with or without intervening bytecodes that do not modify the top of the operand stack). Typically, the operand stack is implemented in memory but with some embodiments of the present invention, the value for the top of the operand stack is stored in one or more registers. As registers have a faster access time than memory, access time for the top of the operand stack may be decreased resulting in faster interpretation of the interpreted program.

Figure 4B:
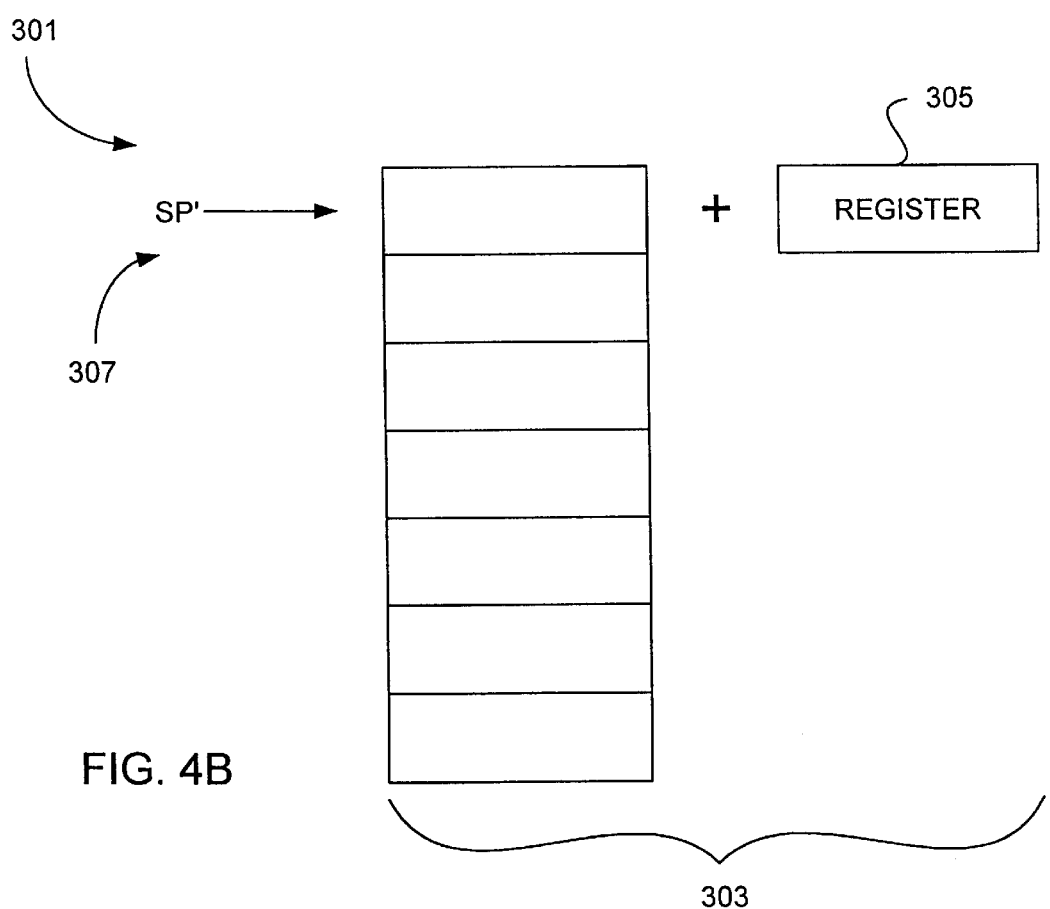
FIG. 4B shows an operand stack of the present invention where the value for the top of the operand stack is stored in a register.

FIG. 4B shows an operand stack 301 that stores data 303. Data 303 includes both data values in memory and a data value for the top of the operand stack stored in a register 305. A stack pointer' (SP') 307 points to the data value conceptually just below the top of operand stack 301. It should be noted that this discussion focuses on a single operand stack. However, there may be multiple operand stacks in a single computer system (e.g., for different threads and methods) which may implemented according to the present invention.

Conventional computer systems typically have many different registers, with certain registers being better suited to store specific data types. For example, a computer may have registers that are 32 bits wide and registers that are 64 bits wide. If an integer on this hypothetical computer is a 32 bit quantity while a long integer is a 64 bit quantity, it would be more efficient to store the data values in a register that matches the size of the data value. Furthermore, computer systems may have registers that are designed to store specific data types like single-precision floating point or double-precision floating point.

More specifically, the IBM personal computers (Intel x86 architectures) include many different types of registers. There are 32 bit registers (e.g., EAX) and floating point registers (e.g., F(0)). Additionally, some of the data types of Intel x86 microprocessors have different sizes then their counterparts in the Java virtual machine. For example, a standard integer data type is 16 bits wide and a long integer data type is 32 bits wide in an Intel 80386 microprocessor. These data types are half the size of their Java virtual machine counterparts. Accordingly, in preferred embodiments where the Java virtual machine is implemented on an x86 machine, an integer in the Java virtual machine is the same size as a long integer in the x86 machine (i.e., both are 32 bit quantities).

As mentioned previously, it is important to keep in mind whether an instruction is a virtual machine instruction or a native machine instruction. Although the Java virtual machine instructions look similar to assembly language, fortunately there is an easily recognizable difference. In the bytecodes described herein for the Java virtual machine, the data type for which the bytecodes pertain precedes the instruction (e.g., ISTORE where the "I" designates integer). This is in stark contrast to the assembly code (or native machine instructions) for the x86 microprocessors where the data type follows the instructions (e.g., POPL where the "L" designates long integer). Although this will likely not be true for all embodiments of the invention, it is hoped that this distinction will aid the reader's understanding of the preferred embodiments described herein.

Figure 4C:
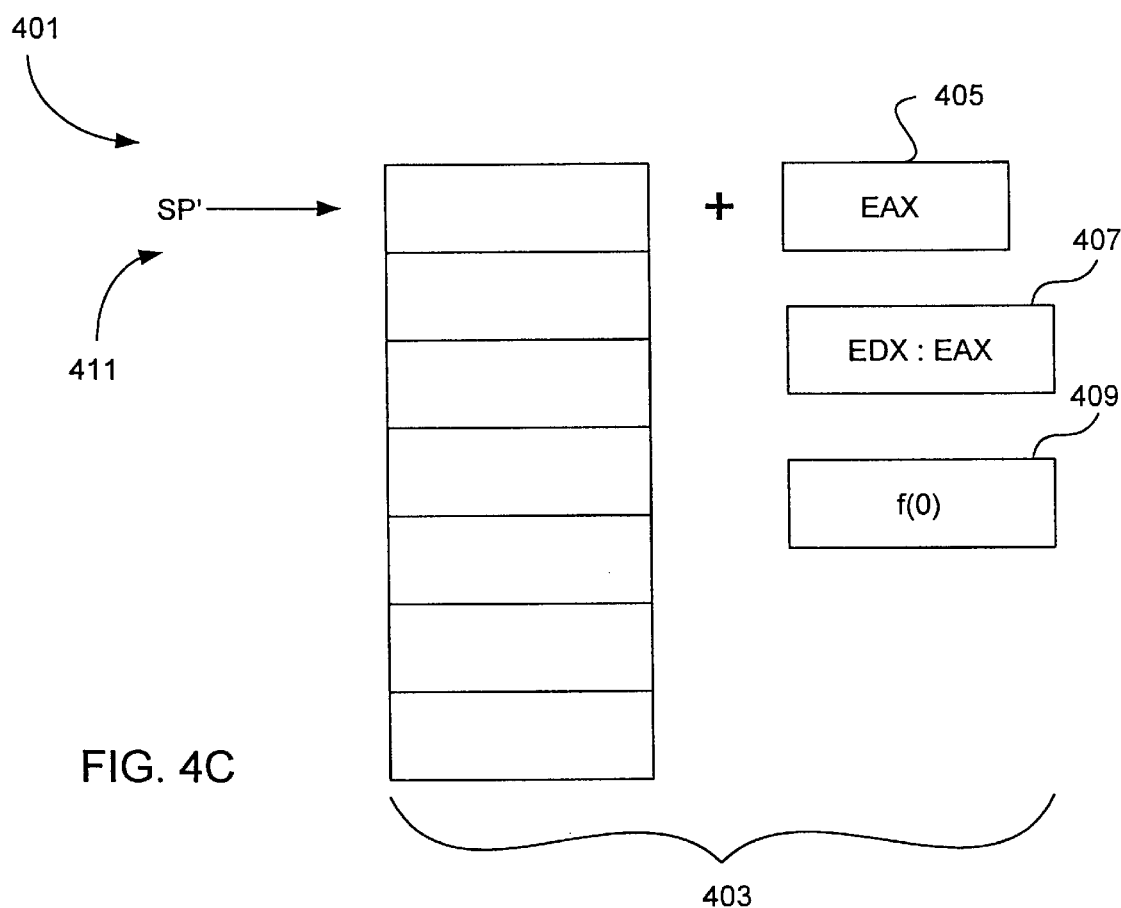
FIG. 4C shows an operand stack of the present invention where multiple registers and registers for storing different data types may store the value for the top of the operand stack.

Returning briefly to FIG. 4B, there is a problem since there is only one register shown and operand stack 301 may be utilized to store different data types so it would be desirable to have different registers available to store the value for the top of the operand stack. FIG. 4C shows an operand stack 401 for a Java virtual machine implemented on an x86 microprocessor. Operand stack 401 stores data 403 which includes both data values in memory and a data value for the top of the operand stack stored in one of registers 405, 407 or 409. In a preferred embodiment, register 405 is a 32 bit register (EAX) for storing virtual machine integers for the top of the operand stack. Register 407 is a combination of two 32 bit registers (EDX:EAX) for storing virtual machine long integers for the top of the operand stack. Register 409 is a 64 bit floating point register (F(0)) for storing both single-precision floating point and double-precision floating point. The designation of specific registers is provided to better illustrate the invention; however, it should be understood that the present invention is not limited to any specific registers or computer architectures.

A stack pointer' (SP') 411 points to the data value conceptually just below the top of operand stack 401. Now that there is more than one register that may be storing the value for the top of the operand stack, it would be desirable to know which register or registers stored this value. One technique would be to store a value in memory or a register indicating the data type of the value on the top of the operand stack. Accordingly, this could be accessed to determine the right register or registers storing the top of the operand stack.

Although this technique may work, it has some significant drawbacks that may make it unsatisfactory. For example, the extra determination of the data type of the top of the operand stack may offset the performance increase of utilizing registers to store the top of the operand stack.

With some embodiments of the present invention, the interpreter operates in multiple states. Each state indicates the data type of the value of the top of the operand stack stored in the one or more registers. The state is an inherent quality of the interpreter at any point in time so a determination of the data type of the top of the operand stack is not required.

In a preferred embodiment, the interpreter may be in one of five different states as follows:

ITOS—an integer for the top of the operand stack (TOS) is stored in register(s)

LTOS—a long integer for the TOS is stored in register(s)

FTOS—a single-precision floating point for the TOS is stored in register(s)

DTOS—a double-precision floating point for the TOS is stored in register(s)

VTOS—void TOS, meaning the TOS is not currently stored in register(s)

As indicated above, the VTOS state is different from the rest of the states because it indicates that the top of the operand stack is not currently stored in any of the registers. It should be apparent that as data values are pushed onto and popped off of the operand stack, the interpreter may alternate between the VTOS state and one of the other states.

In order to assist in managing the different states of the interpreter, a template table (data structure) 501 shown in FIG. 5 is utilized in some embodiments of the invention. Template table 501 is a table that is indexed by bytecodes 503 and includes fields 505, 507, and 509. Although template table 501 may have over two hundred records (e.g., one for each bytecode), only a subset are shown which are thought to best illustrate the invention.

The virtual machine instructions (or bytecodes) are utilized to index the template table 501. Field 505 stores the state of the interpreter that is expected before virtual machine instructions 503 execute. For example, before an ISTORE bytecode is executed (i.e., store the integer on the top of the operand stack), it is expected that the interpreter will be in the ITOS state indicating that there is an integer for the top of the operand stack stored in the one or more registers. If the interpreter is not in the expected state during execution, that does not necessarily indicate there is an error, but as will described in more detail below, preferred embodiments of the invention are able to detect many errors in the bytecode sequence.

Field 507 stores pointers to functions that generate computer code (or a "template" and hence "template table") for the interpreter to execute virtual machine instructions 503. In a preferred embodiment, the names of the functions are the same as the name of the bytecodes and the functions are written in the C++ programming language.

Lastly, field 509 stores the current state of the interpreter after execution of virtual machine instructions 503. For example, after an ISTORE bytecode is executed, the current state of the interpreter would be VTOS since the integer stored in the one or more registers has been popped off the operand stack.

In preferred embodiments, field 505 stores the state of the interpreter that is expected before a virtual machine instruction executes and field 509 stores the current state of the interpreter after the virtual machine instruction executes.

However, in other embodiments field 505 stores the state of the interpreter that is expected before the template function specified in field 507 executes and field 509 stores the current state of the interpreter after the template function executes. In other words, the state of the interpret may be based on the template functions instead of the virtual machine instructions.

Figure 6:
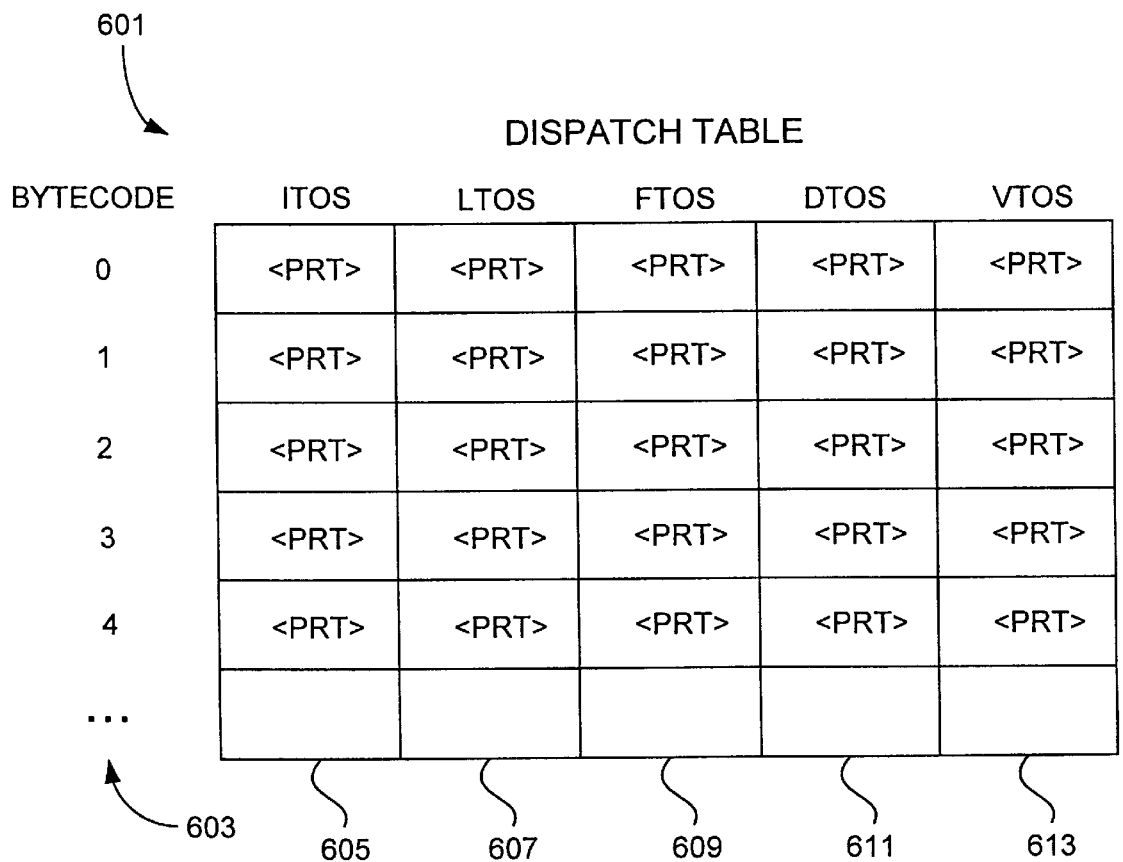
FIG. 6 illustrates a dispatch table generated during interpreter generation that stores pointers to locations within the interpreter utilized to direct interpreter execution flow.

The template table has been described but during interpreter generation, another table (the "dispatch table") is utilized in conjunction with the template table. FIG. 6 shows a layout of a dispatch table 601 which is indexed by virtual machine instructions 603 and includes fields 605, 607, 609, 611, and 613. Field 605 stores pointers to a location or address in the interpreter that executes the indexed virtual machine instructions for the ITOS state. Similarly, fields 607, 609, 611, and 613 store pointers to a location or address in the interpreter that executes the indexed virtual machine instructions for the LTOS, FTOS, DTOS, and VTOS states, respectively. Accordingly, each field is associated with a state of the interpreter. The values of the fields are not shown as they are pointers to within a generated interpreter.

Recalling that the interpreter is typically a software program itself, the dispatch table is a jump table to different locations within the computer code of the interpreter program. In other words, once the next bytecode to be executed is fetched, the interpreter jumps to the location indicated in the dispatch table specified by the next bytecode (utilized as an index) and the current state of the interpreter which specifies one of fields 605, 607, 609, 611, or 613 for the location of the jump. Thus, the program counter of the interpreter is set to the specified address in the dispatch table. In a preferred embodiment, dispatch table 601 is implemented as five single-dimensional tables, one for each interpreter state.

It should be apparent that the template table and the dispatch table may be implemented as one table (or more than two tables for that matter). However, in preferred embodiments, the template table and dispatch table are separate tables as the template table may be utilized solely during interpreter generation and therefore may be discarded after the interpreter is generated. The dispatch table is generated or filled during interpreter generation and advantageously utilized during interpreter execution. Nevertheless, the information in these tables may be implemented in any number of ways in any number of data structures known to those of skill in the art.

Figure 7:
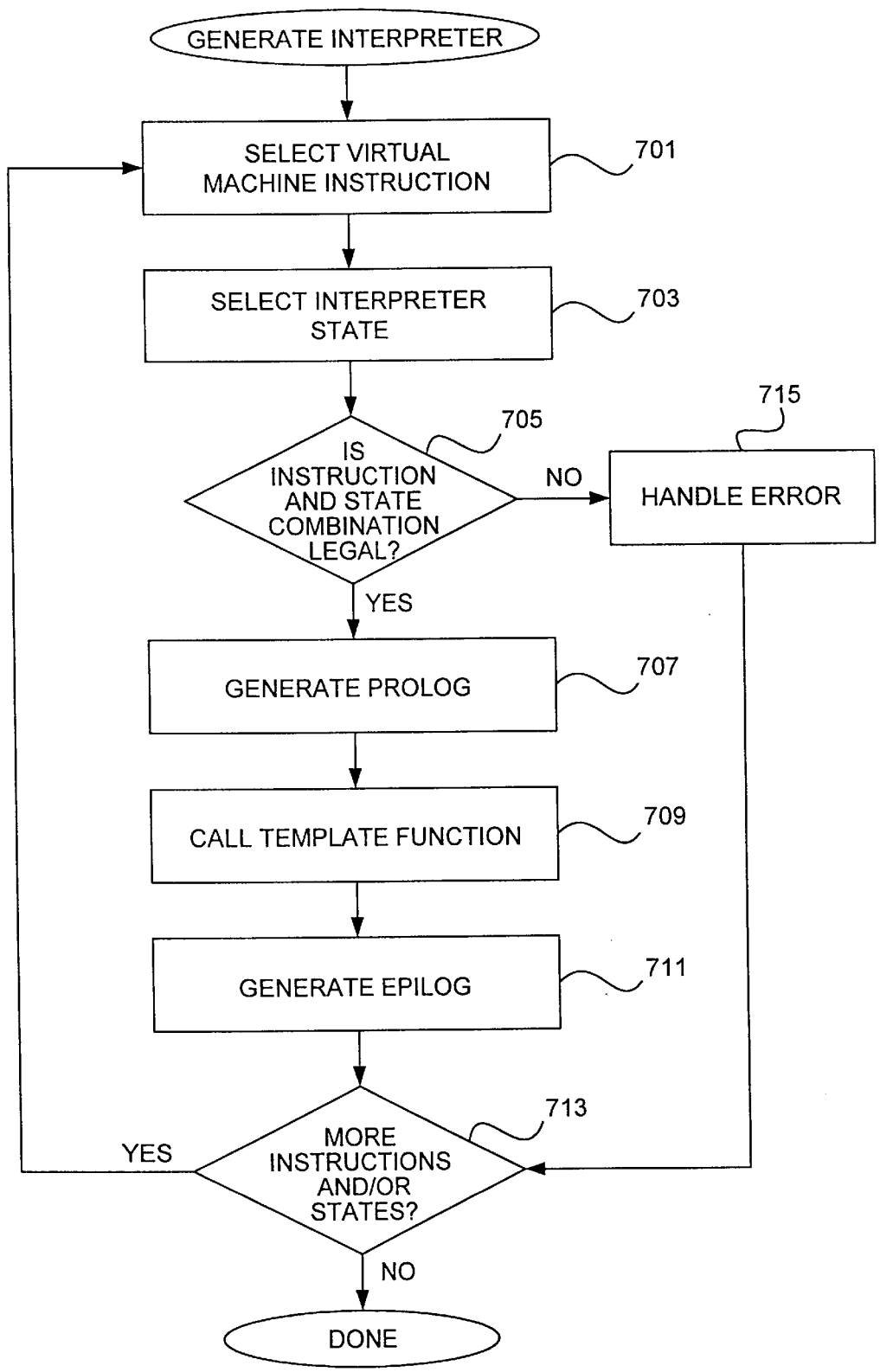
FIG. 7 shows a process of generating an interpreter that utilizes a state of the interpreter to indicate that data type of the value for the top of the operand stack that is store in one or more registers.

Now that the template and dispatch tables have been described, it may be appropriate to describe how the interpreter may be generated. FIG. 7 shows a process of generating an interpreter. In general, the process generates the interpreter by cycling through all the virtual machine instructions and interpreter state combinations. This may be implemented with nested loops, a single loop or other control structures. In a preferred embodiment, nested loops are utilized.

At step 701, the computer system selects a virtual machine instruction (e.g., by one iteration through a loop through the virtual machine instructions). The system selects an interpreter state at step 703. Once a virtual machine instruction and an interpreter state are selected, the rest of the process in FIG. 7 generates computer code for the interpreter that will handle the selected virtual machine instruction when the interpreter is currently in the selected state. Although the drawings show flowcharts for embodiments of the invention for purposes of illustration, no specific ordering or combination of steps should be implied. In general, steps may be reordered, combined or deleted without departing from the scope of the invention.

At step 705, the system determines if the selected virtual machine instruction and interpreter state are legal. In one embodiment, this is accomplished by determining the expected state of the interpreter for the selected bytecode utilizing the template table (see FIG. 5). If the expected state is the same as the selected state, then the combination of selected virtual machine instruction and state is legal.

If the expected state is different from the selected state, this does not necessarily mean that the combination is illegal. Instead, the system determines if there is a legal way (meaning that does not corrupt the operand stack) from the selected state to the expected state. For example, if the expected state is ITOS and the selected state is VTOS, the interpreter may be put in the ITOS state by moving the top data value in the operand stack that is stored in memory into one or more registers (e.g., store the data value pointed to by SP' into a register and then decrement SP'). As another example, if the expected state is ITOS and the selected state is DTOS, there is no legal way to put the interpreter in the ITOS state since the top of the operand stack currently is a double-precision floating point.

In general, it is legal to go from the state of VTOS to any other state or to go from any other state to VTOS. The reason is that these shifts of interpreter state typically include moving a data value from memory to one or more registers, or vice versa.

If the selected virtual machine instruction and interpreter state are legal, the system may generate prolog computer code at step 707. The prolog computer code is any code that would be advantageously generated before execution of the selected virtual machine instruction. In general, the prolog may depend on the selected virtual machine instruction and the selected interpreter state. For example, if the expected state of the interpreter (for the selected virtual machine instruction) is different than the selected interpreter state, the prolog may include computer code to put the interpreter in the expected state. If the expected and selected states of the interpreter are the same, it may not be necessary to generate prolog computer code.

At step 709, the system calls the template function for the selected virtual machine instruction in order to generate computer code for the interpreter to execute the selected virtual machine instruction. In a preferred embodiment, the template function is called by indexing the template table shown in FIG. 5 with the selected virtual machine instruction. The field, field 507, which stores the pointer to (or address for) the template function is then accessed and the template function is called.

The template function generates computer code to execute the selected virtual machine instruction. It may be helpful to discuss a few examples of template functions. As mentioned earlier, in a preferred embodiment the template functions are written in the C++ and Java programming languages for an x86 microprocessor. The following is a template function for the bytecode ILOAD:

```
void TemplateTable::iload(int n) {
    assembler.movl(eax, address(n));
}
```

The ILOAD method is defined for a class called TEMPLATE_TABLE for the Java virtual machine. As the ILOAD bytecode pushes an integer onto the operand stack, the template function by the same name has a parameter that is an integer. The MOVL method is a C++ function for an ASSEMBLER object that pushes the value of N onto the operand stack by placing it in a register. Recall that MOVL corresponds to the x86 assembly language instruction that moves a 32 bit quantity which is an integer in the Java virtual machine instruction but a long integer in the x86 microprocessor.

As another example, the following is a template function for the bytecode IADD:

```
void TemplateTable::iadd() {
    assembler.popl(edx);
    assembler.addl(eax, edx);
}
```

The IADD method is defined for a class called TEMPLATE_TABLE for the Java virtual machine. The expected state for the IADD bytecode is ITOS so there should be an integer at the top of the operand stack stored in a register (EAX in this example). First, the value pointed to by the SP' pointer (which may be the ESP pointer in the x86 microprocessor) is popped off the stack utilizing the POPL method. It is important to understand that the stack we are discussing now is the native stack stored in memory on the target microprocessor (see left side of FIGS. 4B and 4C). Thus, the data value pointed to by the SP' pointer is moved into the register EDX and SP' is then decremented.

At this point, the top of the operand stack is stored in the register EAX and the next highest data value on the operand stack is stored in EDX. The ADDL method corresponds to an assembly language instruction that adds the values stored in EAX and EDX, storing the sum in EAX. The EAX register now stores the desired sum in the appropriate register for the top of the operand stack, meaning the interpreter is now in the ITOS state as specified in the template table of FIG. 5 following the execution of the selected function IADD.

As illustrated above, in preferred embodiments, an object is instantiated for the assembler which includes methods for each assembly language instruction that will be utilized in the interpreter. For simplicity, the names of the methods are the same as the assembly language instructions. It has been found that utilizing an assembler object is beneficial for generation of the interpreter because an extra assembler need not be utilized. In some embodiments, the template functions may be written in assembly language for the desired computer architecture.

At step 711, the system generates epilog computer code. The epilog is computer code that sets up the interpreter to execute the next virtual machine instruction. Thus, the epilog performs the advance and dispatch steps of the interpreter described earlier.

Initially, the prolog computer code fetches the next virtual machine instruction. Since the current state of the interpreter after the execution of the selected virtual machine instruction is known (e.g., from field 509 of the template table in FIG. 5), the next virtual machine instruction may be utilized as an index (or offset) into the dispatch table of FIG. 6 in order to determine the location within the interpreter to execute the next virtual machine instruction. The computer code in the epilog will be discussed in more detail in reference to FIG. 8, but in general, the epilog depends on the selected virtual machine and the current interpreter state.

The system determines if there are more virtual machine instruction/interpreter states for which to generate computer code for the interpreter at step 701. If there are the process returns to step 701 and performs another iteration.

Back at step 705 if it is determined that the selected virtual machine instruction and interpreter state are illegal, the system may generate computer code to handle the error at step 715. Generally speaking, the error is an illegal bytecode sequence. In a preferred embodiment, computer code is generated for the interpreter that jumps to instructions that inform the user that this error has occurred. Although the number of errors detected in this manner will not be as numerous as those detected by a bytecode verifier, it may be desirable especially if one is not required or able to use a bytecode verifier. In some embodiments, the error checking and handling steps 707 and 715 may be omitted.

Figure 8:
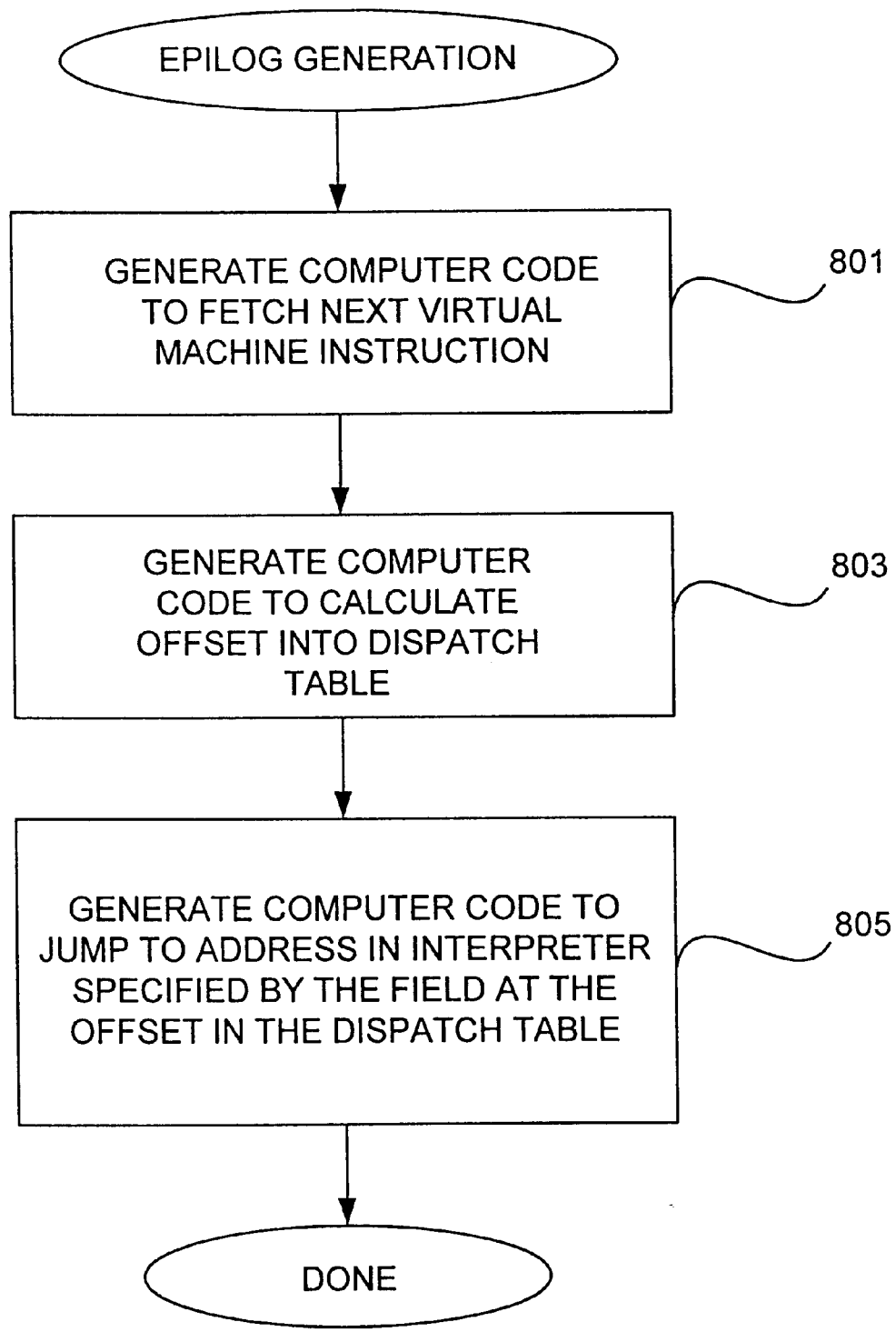
FIG. 8 shows a process of generating epilog computer code that executes the advance and dispatch steps of the interpreter.

FIG. 8 shows a process of generating the epilog computer code for the interpreter. The epilog computer code is generated at step 711 of FIG. 7, but a specific embodiment that generates the epilog computer code will be discussed in reference to FIG. 8. At step 801, computer code that fetches the next virtual machine instruction is generated. The next virtual machine instruction may be fetched by incrementing the current bytecode pointer to the next bytecode and then fetching the bytecode pointed to or referenced by the bytecode pointer. As the size of the virtual machine instructions may vary as in the case of Java bytecodes, in a preferred embodiment a table is utilized to store the size of each bytecode so that the bytecode pointer may be incremented by the size in the table to point to the next bytecode.

Once the next virtual machine instruction is fetched, the system generates computer code to calculate an offset into the dispatch table at step 803. The offset is the number which when added to the starting address of the dispatch table of FIG. 6 results in the field indexed by the next bytecode and the current interpreter state. In a preferred embodiment, the dispatch table includes five single-dimensional tables (or subtables), one for each interpreter state. The current state of the interpreter determines which subtable to utilize. The size of each field in the subtables may be a fixed size (e.g., four bytes) so calculating the offset includes multiplying the next bytecode value by the fixed size. In other embodiments where the dispatch table is a single two-dimensional table, numerous techniques well known to those of skill in the art of calculating offsets into two-dimensional arrays may be utilized. Furthermore, the invention is not limited to tables but may be implemented utilizing any number of data structures including linked lists, hash tables, and the like.

At step 805, the system generates computer code to jump to the location or address in the interpreter specified by the field at the offset in the dispatch table. The dispatch table is a jump table storing addresses within the computer code of the interpreter itself. During interpretation, the epilog computer code performs the advance and dispatch steps for the interpreter. However, other embodiments may place the advance step in the prolog and the dispatch step in the epilog; therefore, the invention is not limited to the specific implementation described herein.

The above has described preferred embodiments of the present invention. Conceptually, one may think that there are five separate interpreters generated: one for each of the interpreter states ITOS, LTOS, FTOS, DTOS, and VTOS. However, in practice, many of the virtual machine instruction/interpreter state combinations are illegal so five separate interpreters are not generated. Furthermore, computer code that executes the virtual machine instructions may be shared so an interpreter according to the present invention may not be much larger in size than a conventional interpreter. In order to more clearly see how computer code that executes the virtual machine instructions may be shared, it may be helpful to the reader to describe how computer code for a sample bytecode may be generated for the interpreter.

EXAMPLE

As described in reference to FIG. 7, an interpreter may be generated by cycling or looping through the possible virtual machine instruction and interpreter state combinations. As the interpreter is generated, a section of computer code is generated for each virtual machine instruction with a dispatch table being utilized during interpreter execution to hold the entry or jump points for different virtual machine instruction and interpreter state combinations. Therefore, the generated interpreter may include a dispatch table and a sequence of sections of computer code that execute different virtual machine instructions (or handle errors).

Figure 9:
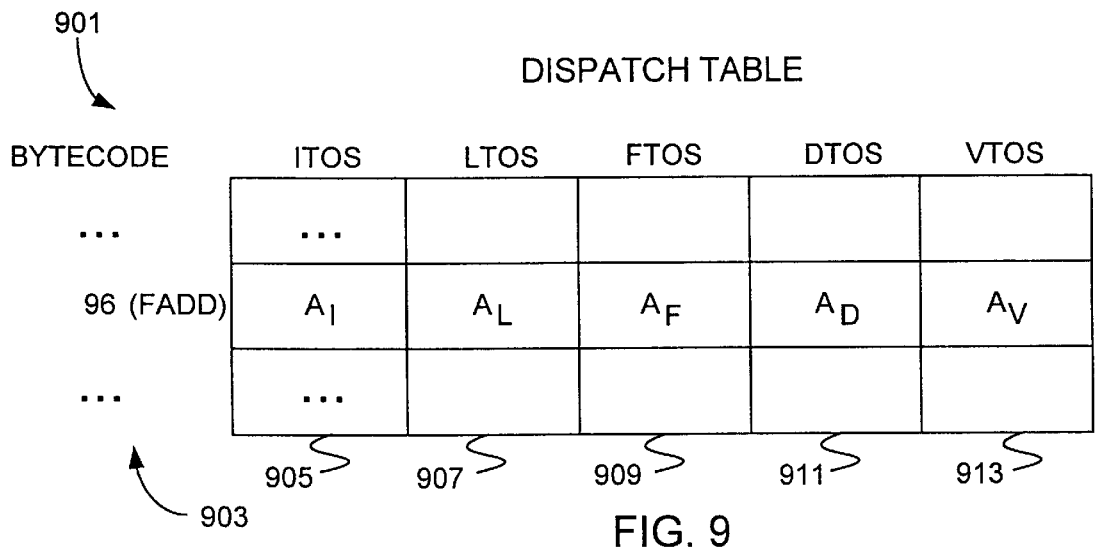
FIG. 9 shows a portion of a dispatch table of FIG. 6 for executing the bytecode IADD.

With this example, it will be described how computer code that executes the IADD bytecode is generated. FIG. 9 shows a portion of a dispatch table 901 pertaining to the IADD bytecode. The structure of dispatch table 901 is the same as described in reference to FIG. 6. In short, the dispatch table is indexed by virtual machine instructions 903 and includes fields 905, 907, 909, 911, and 913, one field for each state of the interpreter.

The decimal value for the IADD bytecode is 96 as shown in parenthesis. Pointer $A_I$ points to a location or address in the interpreter that executes the IADD bytecode if the interpreter is in the ITOS state. Similarly, pointers $A_L$, $A_F$, $A_D$, and $A_V$ point to a locations or addresses in the interpreter that execute the IADD bytecode when the interpreter is in the LTOS, FTOS, DTOS, and VTOS states, respectively.

Figure 10:
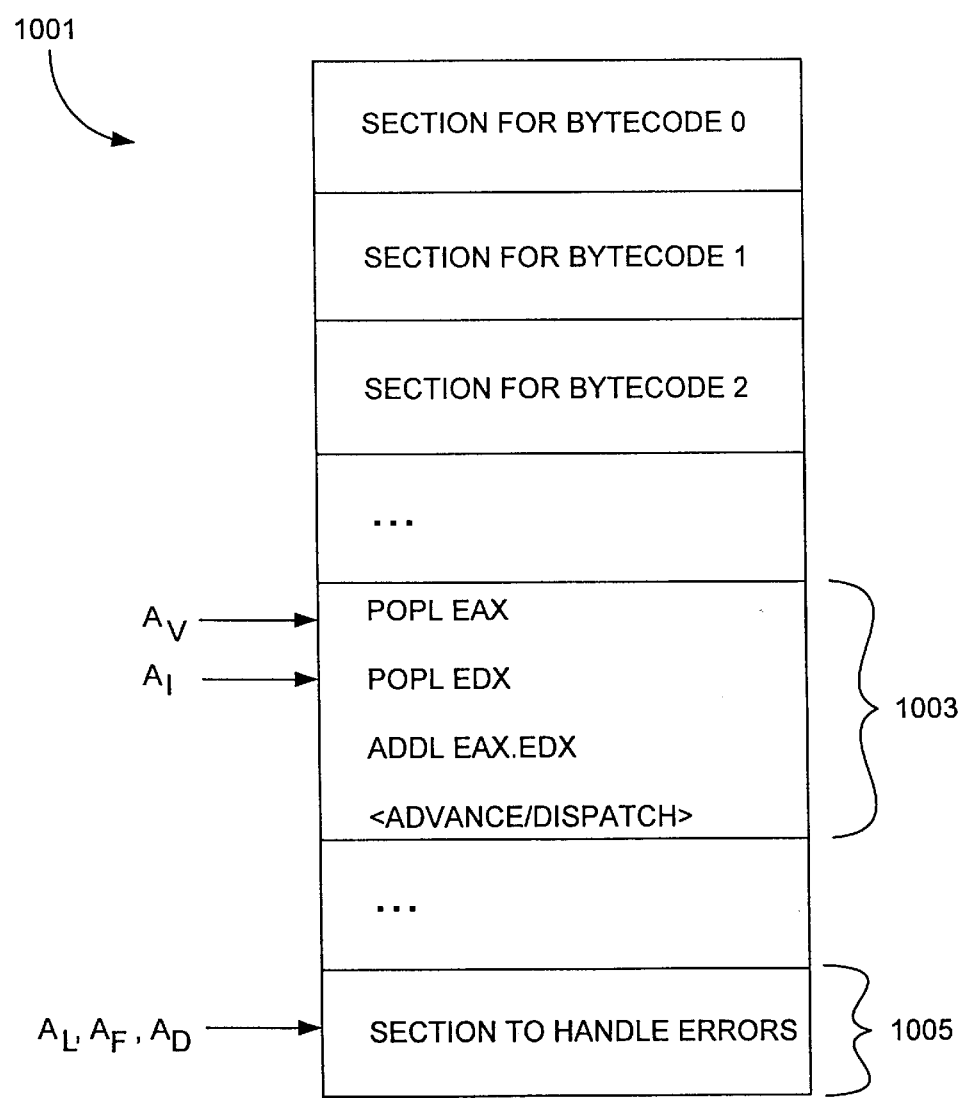
FIG. 10 shows sections of computer code for interpreter that execute virtual machine instructions and handle errors.

The pointers in dispatch table 901 point to addresses within the sequences of sections of computer code generated for the interpreter. FIG. 10 shows sequences of sections of computer code generated for the interpreter. Each section of computer code executes a specific bytecode. Section 1003 includes computer code for execution the IADD bytecode. As shown, section 1003 includes two POPL instructions and an ADDL instruction. These instructions are assembly language (or native machine instructions) for an x86 microprocessor and were generated as follows.

During interpreter generation, the following sections of assembly language instructions may be generated to execute the IADD byte when the interpreter is in the ITOS or VTOS states:

| ITOS | VTOS |
| --- | --- |
| POPL EDX | POPL EAX |
| ADDL EAX, EDX | POPL EDX |
| <DISPATCH/ADVANCE> | ADDL EAX, EDX |
|  | <DISPATCH/ADVANCE> |

For simplicity, the computer code that performs the dispatch and advance steps are not explicitly shown. As shown, the only difference between the two sections of computer code is that there is an additional instruction when the interpreter is in the VTOS state. The POPL EAX pops a value off the stack of the native machine and places it in register EAX. This instruction was generated as prolog to shift the interpreter from the VTOS state into the ITOS state which is the state which is expected for the IADD bytecode (see step 707 of FIG. 7).

The POPL EDX instruction and the ADDL instruction were generated by the template function IADD( ) accessed in the template table (see previous example and step 709 of FIG. 7). Additionally, the computer code that implements the dispatch and advance steps are the epilog computer code (see step 711 of FIG. 7). As each section of code differs only by an initial assembly language instruction, pointers may be utilized to access a single section of computer code.

Accordingly, section 1003 includes computer code to execute the IADD bytecode when the interpreter is in either the ITOS or VTOS states. As shown in FIG. 10, pointer $A_V$ from dispatch table 901 in FIG. 9 points to the first instruction in section 1003 so that the initial instruction that puts the interpreter from the VTOS state into the ITOS state is executed. Pointer $A_I$ from the dispatch table points to the second instruction in section 1003 since the interpreter is in the ITOS state. As shown, whether the interpreter is in the VTOS or ITOS state, the computer code specified by pointer $A_I$ will direct the interpreter to execute IADD bytecodes.

States LTOS, FTOS and DTOS for the IADD bytecode in dispatch table 901 represent illegal states for the bytecode. Accordingly, pointers $A_L$, $A_F$ and $A_D$ pointer to a section 1005 of computer code in FIG. 10 that handles the error. The computer code in section 1005 typically indicates to the user that the interpreter has been placed in an illegal state (see also step 715 of FIG. 7). For simplicity, one section of computer code is shown that handles errors; however, more than one section of computer code (or none if error checking is not desired) may be utilized. Additionally, the sections of computer code the execute virtual machine instructions or handle errors may be arranged in any order.

Figure 11:
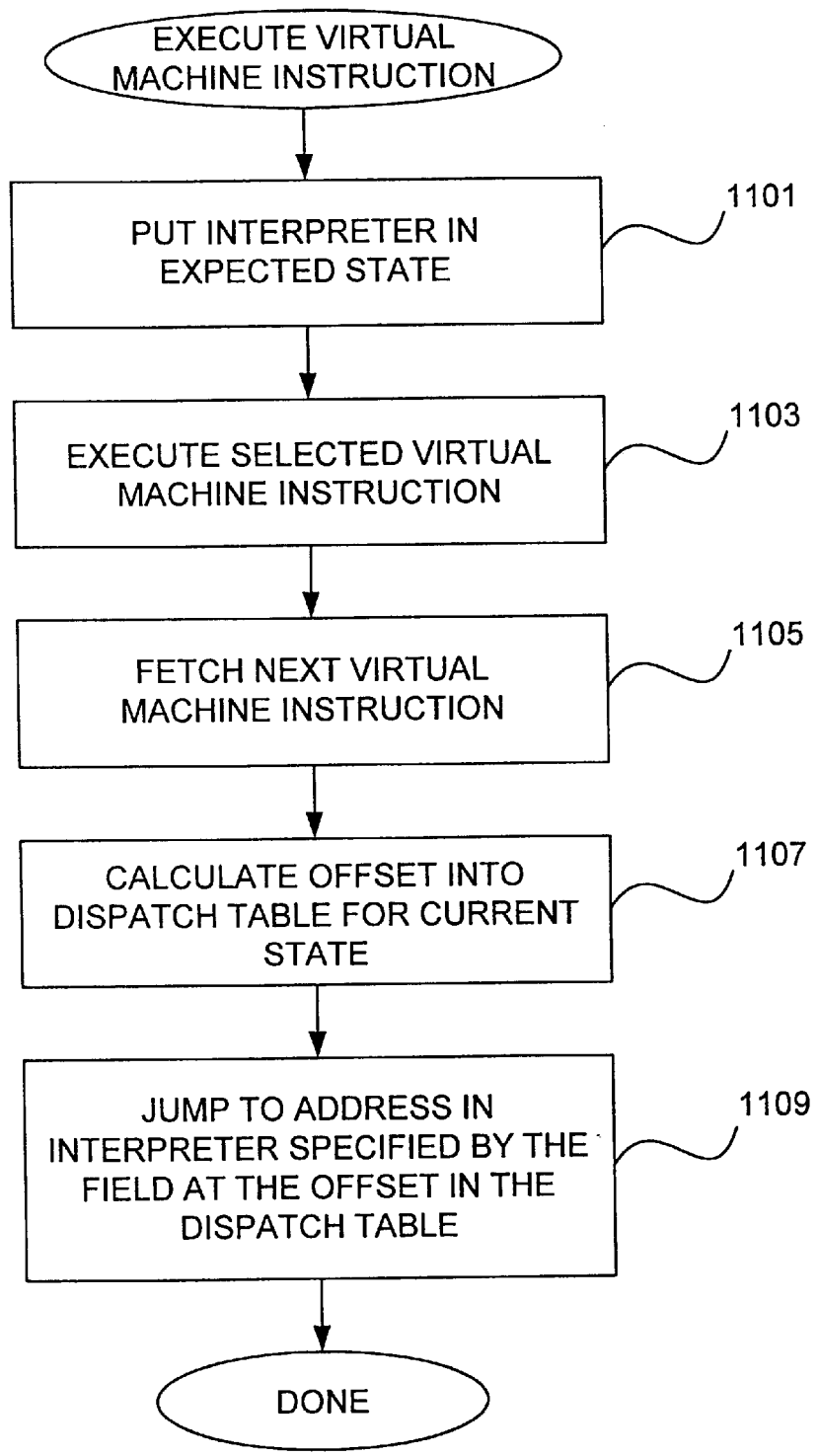
FIG. 11 shows a process of executing a virtual machine instruction with an interpreter according to an embodiment of the present invention.

Having discussed an example, it may be beneficial to describe a process of executing a virtual machine instruction with an interpreter according to one embodiment as shown in FIG. 11. The process shown may be utilized to execute virtual machine instructions in an interpreter generated as described herein. However, the process may be utilized with interpreters that are generated by other methods so the interpreter generation described should not be taken as limiting the implementation of the interpreter.

At step 1101, a computer system puts the interpreter in the expected state, where the expected state is the interpreter state that is expected before a selected virtual machine instruction is executed. In other embodiments, the expected state is the interpreter state that is expected before the computer code in the interpreter that executes the selected virtual machine instruction is run (e.g., the computer code generated by the template function). Step 1101 occurs during interpreter execution and corresponds to the prolog computer code generated at step 707 of FIG. 7 during interpreter generation. If the system is in the expected state, this step may be omitted.

The system executes the selected virtual machine instruction at step 1103. This step occurs during interpreter execution and corresponds to the computer code generated by the template function at step 709 of FIG. 7 during interpreter generation.

Once the selected virtual machine instruction has been executed, the system fetches the next virtual machine instruction at step 1105. Utilizing the next virtual machine instruction, the system calculates an offset into the dispatch table at step 1107. The current state of the interpreter after execution of the selected virtual machine instruction is known. Therefore, the current state along with the next virtual machine instruction may be utilized to calculate an offset into the dispatch table that specifies the location in the interpreter to execute the next virtual machine instruction. In a preferred embodiment where the dispatch table is implemented as multiple single-dimensional subtables, one for each interpreter state, the current state specifies the subtable and the offset is calculated utilizing the next virtual machine instruction (e.g., virtual machine instruction * a fixed size).

At step 1109, the system jumps to the address or location in the interpreter stored in the field at the offset in the dispatch table. The field may include a pointer to a location in the interpreter that executes the next virtual machine instruction. Thus, the jump may cause the system to go back to step 1101 for the next virtual machine instruction.

Steps 1105, 1107 and 1109 occur during interpreter execution and correspond to the computer code generated by the epilog computer code at step 711 of FIG. 7 during interpreter generation. It should be noted that with the embodiment of the invention shown in FIG. 11, explicit error checking is not required. Instead, if there is an error, the system may jump to computer code to handle the error at step 1109. Accordingly, error checking may be achieved without an impact on performance.

Conclusion

While the above is a complete description of preferred embodiments of the invention, various alternatives, modifications and equivalents may be used. It should be evident that the invention is equally applicable by making appropriate modifications to the embodiments described above. For example, the embodiments described have been in reference to increasing the performance of the Java virtual machine interpreting bytecodes, but the principles of the present invention may be readily applied to other systems and languages. Therefore, the above description should not be taken as limiting the scope of the invention which is defined by the meets and bounds of the impended claims along with their full scope of equivalents.

What is claimed is:

1. In a computer system including a plurality of registers, a method for implementing an interpreter including an operand stack having a top, the method comprising:

storing a value for the top of the operand stack in at least one register of the plurality of registers; and utilizing a state of the interpreter to indicate a data type of the value for the top of the operand stack that is stored in the at least one register;

wherein the data type is selected from a group that includes at least integer and void data types, wherein the void data type indicates that the value for the top of the operand stack is not currently stored in the at least one register; and wherein the plurality of registers includes at least two registers that are used for storing values of different data types.

2. The method of claim 1, wherein the group that the data type is selected from further includes long integer, single-precision floating point, and double-precision floating point.

3. The method of claim 1, wherein an instruction that utilizes the top of the operand stack accesses the at least one register.

4. The method of claim 1, wherein the data type indicated by the state of the interpreter specifies the at least one register of the plurality of registers that stores the top of the operand stack.

5. The method of claim 4, wherein the interpreter is a Java virtual machine.

6. In a computer system, a method for generating an interpreter, the method comprising:

selecting a virtual machine instruction to be interpreted by the interpreter;

selecting a state of the interpreter, wherein the state of the interpreter indicates a data type of the value associated with the instruction;

generating computer code for the interpreter to put the interpreter in an expected state for the selected virtual machine instruction if the selected state differs from an expected state; and generating computer code for the interpreter to execute the selected virtual machine instruction.

7. The method of claim 6, wherein the expected state for the interpreter is obtained by accessing a table indexed by virtual machine instructions that stores expected states of the interpreter before execution of the virtual machine instructions.

8. The method of claim 7, wherein the table stores current states of the interpreter after execution of the virtual machine instructions.

9. The method of claim 7, wherein the table stores pointers to functions that generate computer code for the interpreter to execute the virtual machine instructions.

10. The method of claim 6, wherein the computer code for the interpreter to execute the selected function is generated by calling a function specified in a table indexed by virtual machine instructions that stores pointers to functions that generate computer code for the interpreter to execute the virtual machine functions.

11. The method of claim 6, further comprising generating computer code for the interpreter to fetch the next virtual machine instruction.

12. The method of claim 11, further comprising generating computer code for the interpreter to jump to a location in the interpreter that executes the next virtual machine instruction for a current state of the interpreter after execution of the selected virtual machine instruction.

13. The method of claim 12, wherein the location in the interpreter handles an error if the selected virtual machine instruction is illegal for the selected state.

14. The method of claim 6, wherein the interpreter is a Java virtual machine.

15. A computer program product that generates an interpreter, the computer program product comprising:

computer code that selects a virtual machine instruction to be interpreted by the interpreter;

computer code that selects a state of the interpreter, wherein the state of the interpreter indicates a data type of the value associated with the instruction;

computer code that generates computer code for the interpreter to put the interpreter in an expected state for the selected virtual machine instruction if the selected state differs from the expected state;

computer code that generates computer code for the interpreter to execute the selected virtual machine instruction; and a computer readable medium that stores the computer codes.

16. The computer program product of claim 15, wherein the computer readable medium is selected from the group consisting of CD-ROM, floppy disk, tape, flash memory, system memory, hard drive, and data signal embodied in a carrier wave.

17. A data structure stored by a computer readable medium for use in creating an interpreter of virtual machine instructions, comprising:

a table stored by the computer readable medium, the table indexed by the virtual machine instructions;

a first field in the table stored by the computer readable medium, the first field storing expected states of the interpreter before execution of the virtual machine instructions;

a second field in the table stored by the computer readable medium, the second field storing current states of the interpreter after execution of the virtual machine instructions.

18. The data structure of claim 17, further comprising a third field in the table stored by the computer readable medium, the third field storing pointers to functions that generate computer code for the interpreter to execute the virtual machine instructions.

19. The data structure of claim 17, wherein states of the interpreter indicate a data type of a value for the top of an operand stack of the interpreter that is stored in at least one register.

20. The data structure of claim 19, wherein the data type is selected from the group consisting of integer, long integer, single-precision floating point, and double-precision floating point.

21. The data structure of claim 17, wherein the data type is void to indicate that the value for the top of the operand stack is not currently stored in the at least one register.

22. A data structure stored by a computer readable medium for use by an interpreter of virtual machine instructions, the data structure being indexed by the virtual machine instructions and including a plurality of fields in the table stored by the computer readable medium, each field being associated with a state of the interpreter, wherein at least some of the fields store associated pointers to locations in the interpreter that execute the associated indexed virtual machine instructions.

23. The data structure of claim 22, wherein the data structure includes a plurality of fields for each virtual machine instruction, wherein each field is associated with a particular data type, wherein the fields include a plurality selected from the group consisting of integer, long integer, single-precision floating point, double-precision floating point, and void.

24. A data structure as recited in claim 23 wherein the data structure is implemented a plurality of single dimensional tables.

* * * * *